Figure 1A:
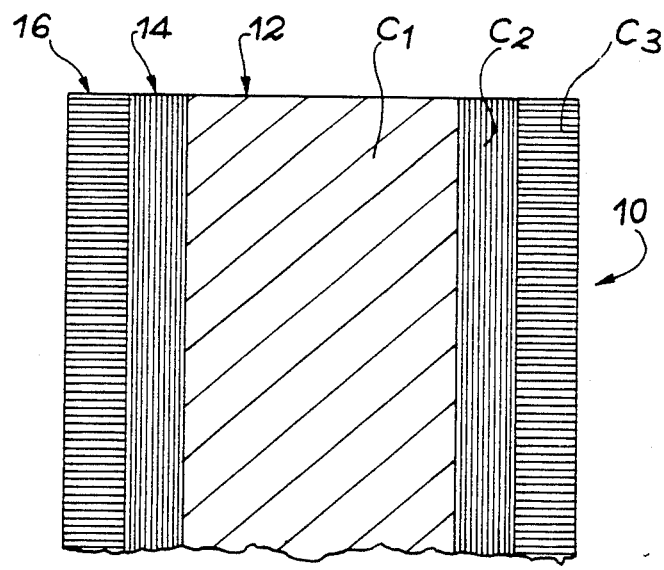

United States Patent [19]

Malhouitre et al.

[11] Patent Number: 4,818,474

[45] Date of Patent: Apr. 4, 1989

[54] PROCESS FOR THE CONTROL OF THE CORE OF A PRESSURIZED NUCLEAR WATER REACTOR

[75] Inventors: Guy Malhouitre, Paris; Mathieu Israel, Bourg-la-Reine; Gérard Gambier, Rambouillet, all of France

[73] Assignee: Electricite De France Service National, Paris, France

[21] Appl. No.: 116,375

[22] Filed: Nov. 2, 1987

[30] Foreign Application Priority Data

Nov. 3, 1986 [FR] France ................. 86 15283

[51] Int. Cl.$^4$ .................. G21C 19/02; G21C 19/33
[52] U.S. Cl. ................... 376/267; 376/435; 376/446
[58] Field of Search ................ 376/267, 435, 446

[56] References Cited

U.S. PATENT DOCUMENTS 3,432,389 3/1969 Stern .
4,302,289 11/1981 Lindgren et al. ................. 376/267

FOREIGN PATENT DOCUMENTS 1814641 4/1986 Fed. Rep. of Germany .
2016901 1/1971 France .
2552921 2/1982 France .

Primary Examiner—Harvey E. Behrend
Attorney, Agent, or Firm—Pearne, Gordon, McCoy & Granger

[57] ABSTRACT

The core of a pressurized water nuclear reactor is partly formed from dismantlable assemblies (10), whereof the rods contain mixed $UO_2$-$PuO_2$ oxide pellets, said assemblies (10) being subdivided into concentric zones (12,14,16) with a plutonium concentration decreasing from the inside to the outside. At the end of each irradiation cycle, the rods ($C_3$) located in peripheral zone (16) are discharged and the rods ($C_2$,$C_1$) located in the other zones (12,14) are transferred towards the outside of assembly (10) into zone (14,16) adjacent to that which they previously occupied. New rods ($C_4$) with a single enrichment are then introduced into the thus freed central zone (12).

5 Claims, 1 Drawing Sheet

PROCESS FOR THE CONTROL OF THE CORE OF A PRESSURIZED NUCLEAR WATER REACTOR

The invention relates to a novel process making it possible to control or manage the core of a pressurized water nuclear reactor, when said core is formed both from uranium dioxide $UO_2$ assemblies and assemblies of mixed uranium and plutonium oxide $UO_2$—$PuO_2$.

In pressurized water nuclear reactors, the reactor core is presently formed from assemblies having rods containing uranium dioxide pellets. A 900 MW reactor has 157 assemblies, each containing 264 rods.

The presently most widely adopted solution for ensuring the management or control of the core of such a reactor consists of replacing one third of the assemblies and at the same time rearranging the remaining assemblies at the end of each irradiation cycle, whose duration is e.g. approximately one year. Thus, each of the assemblies undergoes three irradiation cycles before being discharged from the core. Thus, the management of the core takes place as from an elementary quantity which is the assembly containing e.g. 264 rods in the case of a 900 MW reactor.

In this presently used solution, each of the assemblies is formed from rods containing uranium dioxide $UO_2$ pellets which, at the time of manufacture, all have the same uranium 235 content (e.g. 3.25%).

Moreover, it is known that nuclear fission reactions occurring in the reactor transform part of the uranium 238 into plutonium. When they are discharged from the core, the assemblies consequently contain a large amount of plutonium, which can in turn be used as nuclear fuel following reprocessing.

It is therefore envisaged to recycle the plutonium formed in the irradiated uranium dioxide $UO_2$ assemblies in pressurized water reactors in order to produce new assemblies, whereof the rods contain a mixed oxide of uranium and plutonium $UO_2$—$PuO_2$. Such mixed oxide $UO_2$—$PuO_2$ assemblies would e.g. constitute approximately one third of the core of a pressurized water reactor, whilst the other two thirds would be formed from conventional uranium dioxide assemblies.

For reasons linked with the different physical properties of uranium and plutonium, hot points could occur in the core if the mixed oxide assemblies $UO_2$—$PuO_2$ had a uniform plutonium concentration. This new solution based on the recycling of plutonium consequently presupposes that the mixed uranium and plutonium assemblies are subdivided, from their centre towards their peripherary, into several zones of different Pu concentrations. These assemblies can e.g. be constituted by three concentric zones formed from rods containing mixed oxide $UO_2$—$PuO_2$ pellets, whose plutonium concentration decreases from the central zone towards the peripheral zone.

It is therefore envisaged to equip approximately one third of the core of pressurized water nuclear reactors with such assemblies formed from three types of rods containing mixed $UO_2$—$PuO_2$ oxide pellets having a different plutonium concentration. Like the other assemblies, only one third of these assemblies would be replaced during each cycle, so that their total irradiation time would also be three cycles. Thus, as with the present management of the core, the elementary quantity involved is here again the assembly considered as a whole.

This novel solution, which has the essential advantage of permitting the recycling of plutonium, however, suffers from disadvantages. Thus, at the end of each irradiation cycle, new mixed oxide $UO_2$—$PuO_2$ assemblies formed from rods of different types (e.g. three) must be introduced into the core. Thus, for each of these new assemblies, this presupposes the manufacture of rods having different plutonium concentrations and consequently the manufacturing costs for such assemblies would be high.

Moreover, in order to ensure that a can fracture in one of the rods of an assembly does not require the discharge of said assembly from the reactor core and also to facilitate assembly decanning operations, over the past few years dismantlable assemblies have been developed, in which the rods can be replaced without destroying the assembly structure or framework. Reference is e.g. made to assemblies of the type called AFA (Advanced French Assembly), described on pp 546 to 549 of the article "Les reacteurs nucleaires a eau ordinaire" edited under the direction of Guy DREVON in the Commissariat a l'Energie Atomique collection and published by Eyrolles, 1983.

The present invention therefore relates to a novel process for controlling or managing the core of a pressurized water nuclear reactor, partly constituted by mixed oxide $UO_2$—$PuO_2$ assemblies formed from several concentric zones with different enrichments, said process permitting, other than during the first loading of the core, to manufacture a single type of rod containing mixed $UO_2$—$PuO_2$ oxide pellets with a single enrichment, by using dismantlable assemblies.

According to the invention this objective is achieved as a result of a process for the control of the core of a pressurized water reactor, formed from dismantlable assemblies, each having a group of rods containing fissile material pellets, characterized in that it comprises initially placing in the core at least one first type of assembly, whereof the rods contain uranium oxide pellets and a second type of assembly. whose rods contain mixed uranium and plutonium oxide pellets, the rods of the assemblies of said second type being distributed in accordance with at least two concentric zones containing mixed oxide pellets having different plutonium concentrations, said concentrations decreasing towards the outside of the assemblies from a central zone towards a peripheral zone, making these assemblies undergo successive irradiation cycles and periodically transferring, following each of these irradiation cycles, the rods of each zone of the assemblies of the second type into the adjacent zone towards the outside of said assemblies, the rods located in the peripheral zone being discharged and new rods containing the mixed oxide pellets with a plutonium concentration equal to the plutonium concentration of the pellets contained in the rods initially placed in the central zone being loaded into said central zone.

Obviously, this process is superimposed on the standard control or management process for a pressurized water reactor core. Thus, the internal control of each of the mixed oxide assemblies taking place at the end of each cycle, according to the invention, is accompanied by an overall control of all the core assemblies. More specifically, part of the uranium dioxide assemblies is replaced during each cycle and the other assemblies, no matter whether they are of uranium dioxide or mixed uranium and plutonium oxide, are rearranged in the core in order to obtain an optimum homogenous power distritubion. This overall management of the assemblies is of a conventional nature and does not form part of the invention.

The inventive process making it possible to manage the distribution of the rods in the different zones of the mixed oxide assemblies $UO_2$—$PuO_2$ has significant advantages.

Firstly, during the life of the reactor, a single type of rods containing mixed $UO_2$—$PuO_2$ oxide pellets with a single enrichment has to be manufactured, so that manufacturing costs are greatly reduced.

Moreover, all the rods containing mixed $UO_2$—$PuO_2$ oxide pellets pass successively into different zones of the assemblies which they constitute. Thus, their irradiation is very similar, so that the nuclear material can be better used. The average properties of these assemblies evolve little throughout their life, so that the overall control of the core is improved.

In addition, this process makes it possible to independently control the mixed oxide pellets and the skeleton of the corresponding assemblies. Finally, bearing in mind the non-linear character of the evolution of the multiplication factor of the neutrons as a function of the plutonium content (said factor remaining substantially constant beyond a certain concentration), the plutonium quantity present in the reactor is reduced.

The invention is described in greater detail hereinafter relative to a non-limitative embodiment and the attached drawings, wherein show:

FIG. 1a A longitudinal sectional view very diagrammatically showing part of a mixed oxide $UO_2$—$PuO_2$ assembly, such as when it is initially placed in the core of a pressurized water nuclear reactor.

Figure 1B:
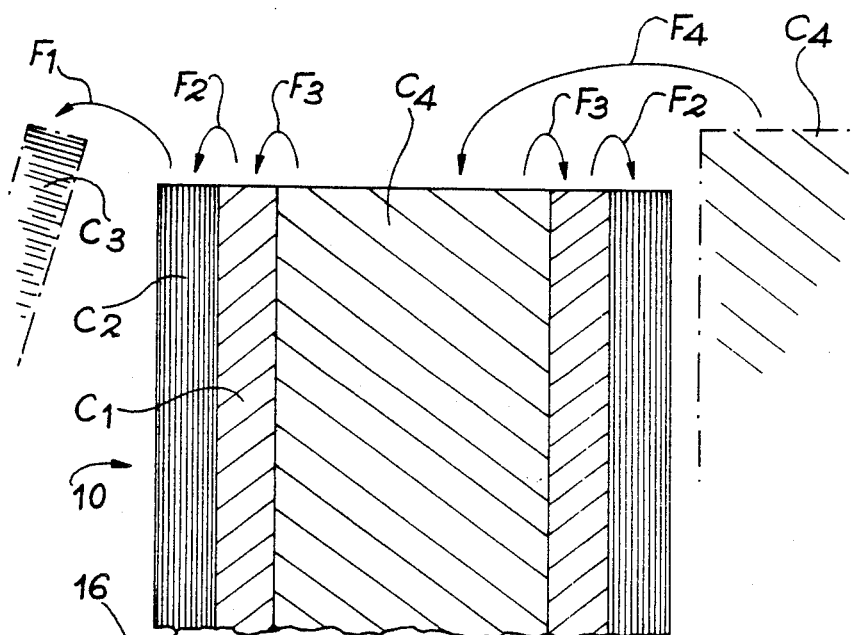

FIG. 1b A view comparable to that of FIG. 1a diagrammatically illustrating the handling operations of the rods of the assembly of FIG. 1a performed in accordance with the invention at the end of the irradiation cycle of said assembly.

The process of the invention makes use of assemblies, whose mechanical structure is known. Therefore no detailed description of this structure will be given.

For a better understanding of the invention, it is merely pointed out that the assemblies constituting the core of pressurized water nuclear reactors are essentially constituted by a framework or structure which supports and positions a bundle or group of fuel rods. The structure generally comprises a lower end fitting, an upper end fitting and intermediate grids or gratings, said components being connected by guide tubes. The latter also serve to receive mobile rods belonging to grapnels fulfilling various functions, such as the checking of the fission reaction in the reactor core.

The fuel rods supported by the structure have a can, in which is located a stack of nuclear fuel pellets, the can being sealed at its ends by plugs.

Generally, the pressurized water reactor assemblies have a square section and are positioned in vertically juxtaposed manner in order to form the reactor core.

In order to permit the realization of the inventive control or management process, said assemblies are dismantlable. More specifically, the upper end fitting can be separated from the remainder of the structure in order to ensure the replacement of the fuel rods. Such dismantlable assemblies are known. As stated hereinbefore, assemblies of the AFA type belong to this category. However, it is also possible to use other dismantlable assembly types.

According to the invention, the assemblies constituting the core of a pressurized water reactor are of two types. A first type of assembly is constituted by rods containing uranium dioxide $UO_2$ pellets. These assemblies are identical to those presently used in most pressurized water reactors and they e.g. form approximately two thirds of the reactor core. A second type of assembly e.g. forming the final third of the reactor core uses a fuel produced by the recycling of the plutonium produced in the uranium dioxide assemblies after irradiation. More specifically, the rods of these assemblies contain mixed uranium and plutonium oxide pellets $UO_2$—$PuO_2$.

In order to take account of the juxtapositioning of the assemblies of both types in the reactor core and in order to prevent the formation of hot points, the mixed uranium and plutonium oxide assemblies are produced in a special way, illustrated in FIG. 1a. In order to simplify figs. 1a and 1b, no account is taken of the construction of the previously described assemblies. The hatched areas correspond to fuel rod systems all constructed in the same way within each zone and the framework or structure is not shown.

Thus, each of these mixed oxide assemblies, such as assembly 10 in FIG. 1a comprises, during the initial loading of the core, several concentric zones in which the plutonium concentration of teh mixed oxide pellets contained in the rods differs. More specifically, this concentration decreases from the centre of the assembly towards its peripherary, the concentration being uniform within each zone.

In the embodiment shown in exemplified manner in FIG. 1a, assembly 10 comprises three concentric zones with different plutonium concentrations. Thus, from the centre of the assembly towards its peripherary, are provided a central zone 12, an intermediate zone 14 and a peripheral zone 16. The dimensions of zones 12, 14 and 16 are determined in such a way that each of them contains the same number of rods.

During the initial loading of the reactor illustrated in FIG. 1a, the central zone 12 is filled with identical new rods $C_1$ containing mixed $UO_2$—$PuO_2$ oxide pellets, whereof the plutonium concentration is higher than in zones 14 and 16. In said zone 12, the initial plutonium concentration can e.g. be approximately 4%.

In the same way, the plutonium concentration of the mixed $UO_2$—$PuO_2$ oxide pellets located in rods $C_2$ filling the intermediate zone 14 is higher than the plutonium concentration of the pellets located in the rods $C_3$ filling the peripheral zone 16. In the aforementioned example, the initial concentrations in zones 14 and 16 can be respectively close to 3% and 2%.

When an irradiation cycle is ended, e.g. after approximately one year following the first loading of the core, the plutonium concentration in each of the zones 12, 14 and 16 of the mixed uranium and plutonium oxide assemblies 10 has dropped. More specifically, the plutonium concentration of rods $C_1$ located in central zone 12 is then very close to the initial concentration in the intermediate zone 14 (approximately 3% in the aforementioned example). In the same way, the plutonium concentration of the rods $C_2$ in intermediate zone 14 has become close to the initially existing concentration in peripheral zone 16 (approximately 2% in the present example). Finally, the plutonium concentration of rods $C_3$ in the peripheral zone 16 has also dropped to well below its initial value.

According to the invention and as is very diagrammatically illustrated in FIG. 1b, each of the mixed uranium-plutonium oxide assemblies 10 is then dismantled and the following operations are performed:

discharge of rods $C_3$ located in peripheral zone 16 (arrow $F_1$ in FIG. 1b), transfer of rods $C_2$ from intermediate zone 14 into peripheral zone 16 (arrow $F_2$), transfer of rods $C_1$ from central zone 12 into intermediate zone 14 (arrow $F_3$), and loading of new rods $C_4$ into central zone 12 (arrow $F_4$).

The new rods $C_4$ introduced into the central zone 12 of assemblies 10 are all identical and contain mixed $UO_2$—$PuO_2$ oxide pellets with a uniform plutonium concentration. which is identical to the plutonium concentration which initially existed in central zone 12. In the aforementioned example, said concentration is approximately 4%.

It should be noted that the concentration is below the mean value of the plutonium concentrations in the rods of a mixed oxide assembly managed solely in a conventional way. Thus, in the present example, this mean value would be approximately 4.5%, whereas the plutonium concentration of rods $C_1$ and then $C_4$ placed in central zone 12 is approximately 4%. At the end of each irradiation cycle, the aforementioned operations are repeated.

Thus, according to the invention, there is a management or control of the position of the rods within the mixed oxide assemblies 10. This is carried out in such a way that, apart from the initial loading of the reactor, a single type of rod containing mixed $UO_2$—$PuO_2$ oxide pellets has to be introduced into the assemblies. Thus, there is a considerable reduction in manufacturing costs compared with a traditional management, in which there would be a complete replacement of assembly 10. Thus, throughout the life of the reactor, it would be necessary to manufacture several rod types corresponding to each of the zones of assemblies 10.

Obviously, the invention is not limited to the embodiment described, in which each of the assemblies 10 is subdivided into three concentric zones. Thus, the number of zones is equal to the number of irradiation cycles undergone by the uranium dioxide assemblies. Thus, the mixed uranium-plutonium oxide assemblies can also be formed from two, or at least four concentric zones, as a function of the number of cycles. The principle of the internal management or control of these assemblies still remains the same. Thus, at the end of each cycle, the rods contained in the peripheral zone are discharged and the rods contained in the other zones are transferred towards the outside of the assembly into the zone adjacent to that which they previously occupied. The central zone, which is consequently freed, is then filled with new rods having a single plutonium enrichment.

As has already been stated, the inventive management of the distribution of the rods within mixed $UO_2$—$PuO_2$ oxide assemblies is added to the overall management of the assemblies within the reactor core. The principle of this overall management remains unchanged compared with that normally used in pressurized water nuclear reactors. It is merely pointed out that the invention tends to simplify this overall management, because the average properties of the mixed $UO_2$—$PuO_2$ oxide assemblies constituting e.g. approximately one third of the core assemblies, evolves very little over a period of time. Thus, these assemblies are to a certain extent restored to a new state at the end of each cycle, whereas conventional uranium dioxide assemblies are only replaced after three successive irradiation cycles.

The process for the management of rods within mixed oxide assemblies according to the invention also makes it possible to successively pass each of the rods into the different zones of said assemblies. Therefore, when these rods are discharged, they have a very similar irradiation. This feature makes it possible to envisage a better use of the fuel compared with the mixed oxide assemblies which would remain in the core for three successive cycles. Thus, in view of the fact that the neutron multiplication factor as a function of the plutonium content increases ever more slowly when said content rises, the plutonium concentration in the rods introduced during each cycle into the central zone of the mixed oxide assemblies is below the mean value of the concentration in a mixed oxide assembly which would remain in the core for several successive cycles. For example, if said mean value is approximately 4.5%, a concentration of close to 4% would be adequate.

Finally, it should be noted that the invention makes it possible to reuse the framework of the mixed oxide assemblies for a number of cycles which is only dependent on the ageing of said framework. This feature also helps to reduce manufacturing costs.

We claim:

1. Process for the control of the core of a pressurized water reactor, formed from dismantlable assemblies, each having a group of rods containing fissile material pellets, characterized in that it comprises initially placing in the core at least one first type of assembly, whereof the rods contain uranium oxide pellets and a second type of assembly (10) whose rods ($C_1$, $C_2$, $C_3$) contain mixed uranium and plutonium oxide pellets, the rods of the assemblies of said second type being distributed in accordance with at least two concentric zones (12,14,16) containing mixed oxide pellets having different plutonium concentrations, said concentrations decreasing towards the outside of the assemblies from a central zone (12) towards a peripheral zone (16), making these assemblies (10) undergo successive irradiation cycles and periodically transferring, following each of these irradiation cycles, the rods ($C_1$, $C_2$) of each zone (12, 14) of the assemblies of the second type into the adjacent zone (14, 16) towards the outside of said assemblies, the rods ($C_3$) located in the periheral zone (16) being discharged and new rods ($C_4$) containing the mixed oxide pellets with a plutonium concentration equal to the plutonium concentration of the pellets contained in the rods ($C_1$) initially placed in the central zone (12) being loaded into said central zone.

2. Process according to claim 1, characterized in that the same number of rods ($C_1$, $C_2$, $C_3$, $C_4$) is placed in each of the zones (12,14,16) of the assemblies (10) of the second type.

3. Process according to claim 1, characterized in that the rods of the assemblies (10) of the second type are distributed in three concentric zones (12,14,16).

4. Process according to claim 1, characterized in that each of the assemblies has a dismantlable structure supporting the rods and the structures of the assemblies (10) of the second type are changed after a number of irradiation cycles which is independent of the number of irradiation cycles undergone by the rods ($C_1$, $C_2$, $C_3$, $C_4$) of said assemblies.

5. Process according to claim 1, characterized in that the assembiles of the first type are replaced after a given number of irradiation cycles, the number of zones (12,14,16) of assemblies of the second type being equal to said number of cycles.

* * * * *